(12) United States Patent
Li et al.

(10) Patent No.: US 11,768,858 B2
(45) Date of Patent: Sep. 26, 2023

(54) METHOD OF POWER USER CLASSIFICATION BASED ON DISTRIBUTED K-MEANS, STORAGE MEDIUM AND CLASSIFICATION DEVICE

(71) Applicants: Xi'an Jiaotong University, Shaanxi (CN); State Grid Jiangsu Electric Power Co. Ltd, Jiangsu (CN); Hohai University, Nanjing (CN)

(72) Inventors: Gengfeng Li, Shaanxi (CN); Yuxiong Huang, Shaanxi (CN); Liyin Zhang, Shaanxi (CN); Jiangfeng Jiang, Shaanxi (CN); Qirui Qiu, Shaanxi (CN); Shihai Yang, Jiangsu (CN); Xingying Chen, Nanjing (CN); Xiaodong Cao, Jiangsu (CN); Kun Yu, Nanjing (CN)

(73) Assignees: XI'AN JIAOTONG UNIVERSITY, Xi'an (CN); State Grid Jiangsu Electric Power Co. Ltd, Nanjing (CN); Hohai University, Nanjing (CN)

( * ) Notice: Subject to any disclaimer, the term of this patent is extended or adjusted under 35 U.S.C. 154(b) by 301 days.

(21) Appl. No.: 17/355,189

(22) Filed: Jun. 23, 2021

(65) Prior Publication Data
US 2021/0406284 A1 Dec. 30, 2021

(30) Foreign Application Priority Data
Jun. 24, 2020 (CN) .......................... 202010586720.6

(51) Int. Cl.
*G06F 16/28* (2019.01)
*G06F 1/28* (2006.01)
(Continued)

(52) U.S. Cl.
CPC .............. *G06F 16/285* (2019.01); *G06F 1/28* (2013.01); *G06F 17/16* (2013.01); *G06Q 30/0205* (2013.01); *G06Q 50/06* (2013.01)

(58) Field of Classification Search
CPC .......... G06F 1/28; G06F 16/285; G06F 17/16; G06Q 30/0205; G06Q 50/06; Y02D 10/00
See application file for complete search history.

(56) References Cited

U.S. PATENT DOCUMENTS

2014/0074670 A1* 3/2014 Garrity .................. G06Q 50/06
705/30
2017/0193094 A1* 7/2017 Tong ................... G06F 16/3331

FOREIGN PATENT DOCUMENTS

| CN | 107248031 A | 10/2017 |
| CN | 108345908 A | 7/2018 |

(Continued)

OTHER PUBLICATIONS

CN First Office Action(202010586720.6); dated Jan. 29, 2022.

*Primary Examiner* — Terrell S Johnson
(74) *Attorney, Agent, or Firm* — W&G Law Group

(57) ABSTRACT

A method of a power user classification based on distributed K-means, a storage medium and a classification device are provided. The method includes: obtaining, by N load aggregators, power consumption data of power users managed by respective load aggregators; performing, by each load aggregator, a normalization operation on time series load data of the power users managed by the load aggregator; forming a N×N dimensional adjacency matrix A; performing K-means clustering on normalized time series load data, to obtain the respective centroids and user groups characterized by the respective centroids; sharing, by the respective load aggregators, the centroids and the number of users under the respective centroids based on the adjacency matrix A, and (Continued)

obtaining consistent centroids by multiple load aggregators; after an overall iteration ends, obtaining, by the respective load aggregators, the consistent centroids consistent with the K-means centroid based on global data, to realize user classification.

20 Claims, 2 Drawing Sheets

(51) Int. Cl.
    *G06F 17/16*     (2006.01)
    *G06Q 30/0204*     (2023.01)
    *G06Q 50/06*     (2012.01)

(56)     References Cited

FOREIGN PATENT DOCUMENTS

| | | |
|---|---|---|
| CN | 109902953 A | 6/2019 |
| CN | 110580585 A | 12/2019 |
| CN | 110766516 A | 2/2020 |

\* cited by examiner

METHOD OF POWER USER CLASSIFICATION BASED ON DISTRIBUTED K-MEANS, STORAGE MEDIUM AND CLASSIFICATION DEVICE

CROSS-REFERENCE TO RELATED APPLICATIONS

The present application claims priority to Chinese Patent Application No. 202010586720.6, filed on Jun. 24, 2020, the content of which is incorporated herein by reference in its entirety.

TECHNICAL FIELD

The present disclosure relates to the technical field of demand side information management of power system, and more particularly, to a method of a power user classification based on distributed K-means, a storage medium and a classification device.

BACKGROUND

As large amounts of intermittent renewable energy sources such as wind power and photovoltaic, as well as flexible loads such as heat pumps and electric vehicles, are connected to a power grid, grid operators face an increased pressure on supply and demand balance. In this context, a user-side demand response mechanism will become an essential resource for stable operation of the power grid.

Residential loads, as important demand response resources, requires to aggregate by a load aggregator as an intermediate agent, and then participate in demand response services uniformly. Further, the load aggregator can classify residential users based on time series load data of users, to obtain typical user categories. Different services can be provided to different typical user categories, in order to meet needs of refined services. However, due to factors such as competition relation and protection of power consumption privacy of the users, the load aggregators generally do not share power consumption data of the users. It will result in that different load aggregators have different categories of typical users, which brings inconvenience for power grid operators and multiple load aggregators to participate in the power market and formulate demand response mechanisms.

SUMMARY

In view of deficiencies above in the conventional technology, a technical problem to be solved by the present disclosure is to provide a method of a power user classification based on consistency distributed K-means, so as to obtain globally consistent typical user category by multiple load aggregators in the case that no power consumption data of user is shared.

The present disclosure adopts following technical solutions:

A method of a power user classification based on distributed K-means includes following steps:

S1, obtaining, by N load aggregators, power consumption data of power users managed by respective load aggregators, the power consumption data including a serial number of power user and time series load data;

S2, performing, by each of the load aggregators, a normalization operation on the time series load data of the power users managed by the load aggregator, according to a uniform normalization criterion;

S3, forming a N×N dimensional adjacency matrix A according to an information sharing relationship of the load aggregators;

S4, performing, by each load aggregator, K-means clustering on the time series load data of the power users managed by the load aggregator after the normalization operation in the step S2, to obtain centroids and user groups characterized by the respective centroids; sharing, by the respective load aggregators, the centroids and the number of users under the respective centroids, based on the adjacency matrix A of the step S3; performing overall iterations repeatedly according to a corresponding function, and obtaining consistent centroids by the respective load aggregators; and S5, after the overall iteration ends, obtaining, by the respective load aggregators, the consistent centroids consistent with the K-means centroids based on global data, to realize user classification.

Specifically, in the step S2, power consumption data $x_{id,d}$ of a user with a serial number of id at the d-th time point after the normalization operation is:

$$x_{id,d} = \frac{1}{M_{id}} \cdot P_{id,d}, \quad M_{id} = \sum_{d=1}^{D} P_{id,d}$$

where a subscript id represents a serial number of user; $M_{id}$ represents a total amount of power consumption of the user with serial number of id in a studied time scale; D represents a total number of data points in the studied time scale; $P_{id,d}$ represents power consumption data of the user with a serial number of id at the d-th time point before the normalization operation, which is an actual power consumption capacity.

Specifically, in the step S3, the N×N dimensional adjacency matrix A is:

$$A = \begin{bmatrix} a_{1,1} & a_{1,2} & \cdots & a_{1,N} \\ a_{2,1} & a_{2,2} & \cdots & a_{2,N} \\ \vdots & \cdots & \ddots & \vdots \\ a_{N,1} & a_{N,2} & \cdots & a_{N,N} \end{bmatrix},$$

where N represents the number of load aggregators.

Further, the adjacency matrix A has doubly stochastic:

$$\forall i, j \in [1, N], \sum_{k=1}^{N} a_{i,k} = 1, \sum_{k=1}^{N} a_{k,j} = 1;$$

$\forall i, j \in [1,N]$, if there is information interaction between load aggregators i and j, then $a_{i,j} > 0$; if $a_{i,j} > 0$, then $a_{j,i} > 0$;

$\forall i \in [1,N]$, $a_{i,i} > 0$.

Specifically, the step S4 includes:

S401, performing the K-means clustering on time series load data of the power users managed by each load aggregator by taking $c_{i,k}(t)$ as initial centroids, where $i \in [1,N]$, $k \in [1,K]$, K represents the number of centroids, and t represents the number of overall iterations;

S402, performing local iteration according to the adjacency matrix;

S403, finishing the local iteration, in a case that the number $q_{i,k}(s,t+1)$ of the users under the respective centroids is not changed with an increase in the number s of local iterations; and S404, if ∀k∈[1,K],i∈[1,N] after the local iteration, considering that $c_{i,k}(t+1)$ satisfies consistency requirements, and respective load aggregators obtain consistent centroids, then stopping calculation and outputting a result; otherwise, returning to the step S401 to continue the overall iteration.

Further, in the step S401, if t=0, the initial centroids are randomly selected, and the number $q_{i,k}(t)$ of the users under each of the centroids is recorded.

Further, in the step S402, the local iteration includes:

$$c_{i,k}(0, t+1) = c_{i,k}(t+1)$$

$$q_{i,k}(0, t+1) = q_{i,k}(t+1)$$

$$c_{i,k}(s+1, t+1) = \frac{\sum_{j=1}^{N} a_{i,j} c_{j,k}(s, t+1) q_{j,k}(s, t+1)}{\sum_{j=1}^{N} a_{i,j} q_{j,k}(s, t+1)}$$

$$q_{i,k}(s+1, t+1) = \sum_{j=1}^{N} a_{i,j} q_{j,k}(s, t+1)$$

where s represents the number of local iterations, $c_{i,k}(0, t+1)$ represents initial centroids of the local iteration in the (t+1)-th global iteration, $q_{i,k}(0,t+1)$ represents the number of users under respective initial centroids of the local iteration in the (t+1)-th global iteration, $c_{i,k}(s+1,t+1)$ represents centroids of the (s+1)-th local iteration in the (t+1)-th global iteration, $q_{i,k}(s+1,t+1)$ represents the number of users under respective centroids of the (s+1)-th local iteration in the (t+1)-th global iteration, t represents the number of global iterations, $a_{i,j}$ represents an interaction coefficient between the aggregators i and j, $c_{j,k}(s,t+1)$ represents centroids of the s-th local iteration in the (t+1)-th global iteration, $q_{j,k}(s,t+1)$ represents the number of users under respective centroids of the s-th local iteration in the (t+1)-th global iteration, and N represents the number of load aggregators.

Further, the step S403 includes:

$$c_{i,k}(t+1) = c_{i,k}(S, t+1)$$

where S represents the total number of local iterations, and $c_{i,k}(t+1)$ represents the k-th centroid of an initial i-th load aggregator in the (t+1)-th overall iteration.

In another technical aspect of the present disclosure, a computer-readable storage medium is provided for storing one or more programs, and the one or more programs include instructions, and the instructions, when executed by a computing device, cause the computing device to execute any one of the methods.

In another technical aspect of the present disclosure, a classification device includes:

one or more processors, a memory and one or more programs, wherein one or more programs are stored in the memory and configured to be executed by the one or more processors, and the one or more programs include instructions for executing any one of the methods.

Compared with the conventional technology, the present disclosure has at least following beneficial effects.

In the method of the power user classification based on distributed K-means according to the present disclosure, multiple load aggregators can obtain globally consistent centroids in a case of only exchanging their clustering results. Since block processing of data and information interaction only involve category information, by the method according to the present disclosure, a calculation amount for a single calculation can be reduced while protecting power consumption privacy of the power users. In the context of grid operators and multiple load aggregators jointly participating in the power market, it has laid foundation for formulation of refined demand response services.

Further, the respective load aggregators adopt a uniform normalization criterion to normalize daily load time series data of the power users managed by the respective load aggregators, to ensure consistency requirements of a data format for subsequent distributed clustering.

Further, an abstract information sharing relationship among the load aggregators can be represented concretely by the adjacency matrix A.

Further, the respective load aggregators can obtain globally consistent centroids by only exchanging their respective clustering results. This has considered limitations that the load aggregators cannot share power consumption data of the users due to reasons such as competition and user privacy protection.

Further, the respective load aggregators perform K-means clustering on the daily load time series data of the power consumption users under their respective management, and the load aggregators do not share power consumption data of the users.

Further, the load aggregators share their respective clustering results according to the adjacency matrix, and local iterations are carried out according to the distributed clustering algorithm, so that the centroids of the respective load aggregators tend to be consistent.

Further, the local iteration ends when increase in the local iteration numbers does not affect the number $q_{i,k}(s,t+1)$ of users under the respective centroids, which ensures an efficiency of the distributed clustering algorithm.

Based on the above, the method of the present disclosure can realize the global consistent classification for power user under a condition that the power consumption data of the users is not shared between load aggregators.

The technical solution of the present disclosure will be further described in detail below through the drawings and embodiments.

DESCRIPTION OF EMBODIMENTS

Figure 1:
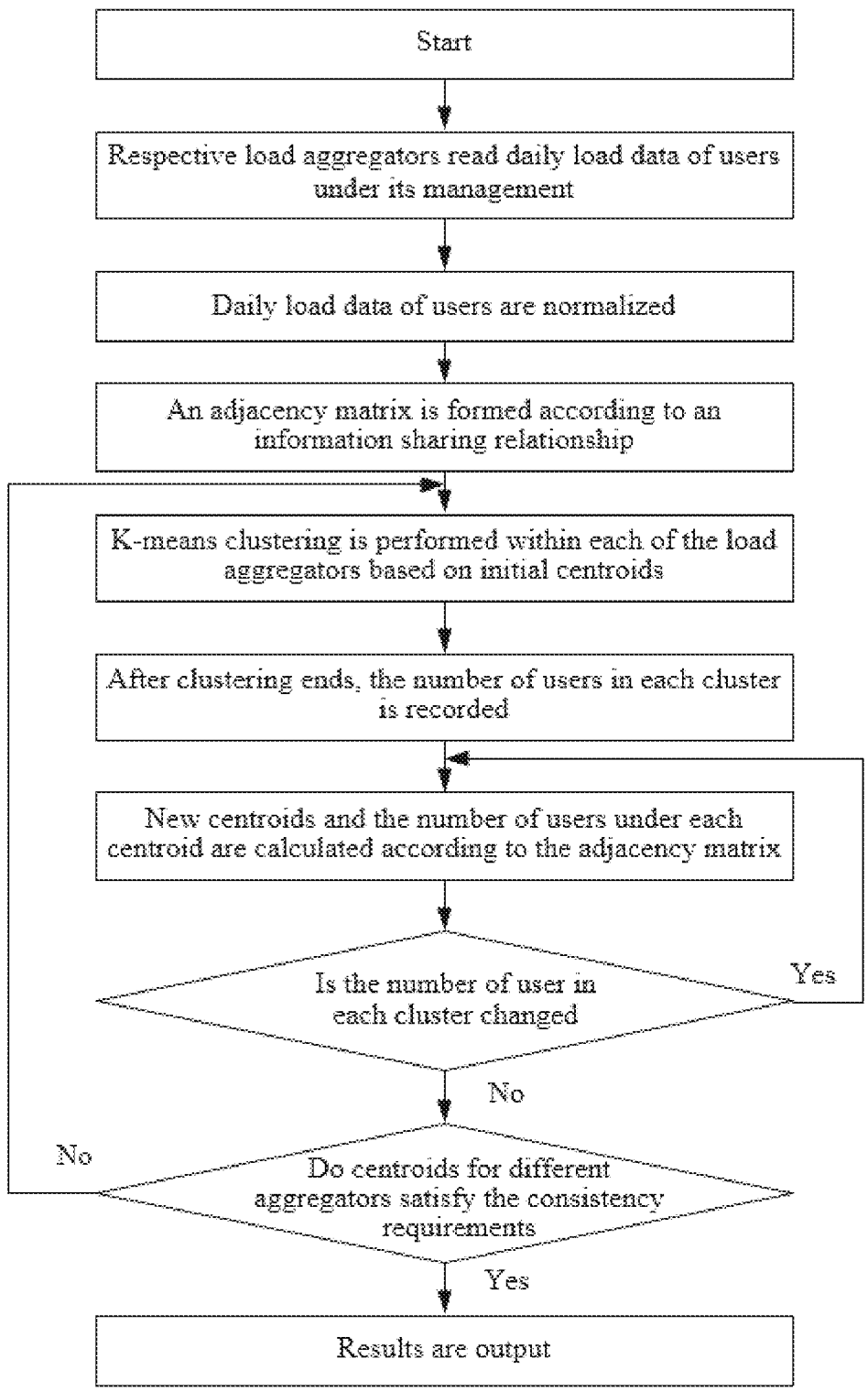
FIG. 1 is a flowchart of the present disclosure.

The accompany drawings show various structural schematic diagrams according to disclosed embodiments of the present disclosure. The drawings are not drawn to scale, and some details are enlarged and some details may be omitted for clarity of presentation. Shapes of various regions and layers shown in the drawings and relative sizes and positional relationship between them are only exemplary, there may be deviations due to manufacturing tolerances or technical limitations in practice, and those skilled in the art can additionally design regions/layers with different shapes, sizes, and relative positions according to actual needs.

A method of a power user classification based on consistency distributed k-means is provided according to the present disclosure, which involves time series load data of power users and information sharing relationship among respective load aggregators. In the classification method, an adjacency matrix is established, the respective load aggregators share centroids and the number of the users in each cluster according to the adjacency matrix, iterations are carried out repeatedly according to a corresponding function, and finally all the load aggregators obtain consistent centroids.

Referring to FIG. 1, a method of a power user classification based on consistency distributed k-means is provided according to the present disclosure. The classification method includes following steps.

In S1, N load aggregators obtain power consumption data of all power users managed by respective load aggregators, where the power consumption data includes a serial number of the power user and time series load data.

In S2, each of the load aggregators performs, according to a uniform normalization criterion, a normalization operation on daily load time series data of the power users under its management.

A normalization formula is as follows:

$$x_{id,d} = \frac{1}{M_{id}} \cdot P_{id,d}, M_{id} = \sum_{d=1}^{D} P_{id,d}$$

where a subscript id represents a serial number of a user; $x_{id,d}$ represents power consumption data of a user with a serial number of id at the d-th time point after the normalization; $M_{id}$ represents a total amount of power consumption of the user with the serial number of id in a studied time scale (for example, hour, day, week, etc.); D represents a total number of data points in the studied time scale; $P_{id,d}$ represents power consumption data, that is, an actual power consumption capacity, of the user with the serial number of id at the d-th time point before the normalization.

In S3, a N×N dimensional adjacency matrix A is formed according to an information sharing relationship of the load aggregators.

The information sharing relationship of the load aggregators is usually determined by factors such as a geographic location of a data center and a power market, and the adjacency matrix is as follows:

$$A = \begin{bmatrix} a_{1,1} & a_{1,2} & \cdots & a_{1,N} \\ a_{2,1} & a_{2,2} & \cdots & a_{2,N} \\ \vdots & \cdots & \ddots & \vdots \\ a_{N,1} & a_{N,2} & \cdots & a_{N,N} \end{bmatrix}.$$

The adjacency matrix A has doubly stochastic:

$$\forall i, j \in [1, N], \sum_{k=1}^{N} a_{i,k} = 1, \sum_{k=1}^{N} a_{k,j} = 1.$$

$\forall i, j \in [1,N]$, if there is information interaction between load aggregators i and j, then $a_{i,j} > 0$; if $a_{i,j} > 0$, then $a_{j,i} > 0$;
$\forall i \in [1,N]$, $a_{i,i} > 0$.

In S4, each load aggregator performs K-means clustering on normalized daily load time series data of the power users under its management, to obtain centroids and user groups characterized by the respective centroids; the load aggregators share the centroids and the number of users under the respective centroids based on the adjacency matrix; overall iterations are performed repeatedly according to a corresponding function, and finally multiple load aggregators each obtain consistent centroids.

In S401, K-means clustering is performed within each of the load aggregators by taking $c_{i,k}(t)$ as initial centroids, where $i \in [1,N]$, $k \in [1,K]$, K is the number of the centroids, and t is the number of overall iterations. If t=0, the initial centroids are randomly selected. The number $q_{i,k}(t)$ of the users under each centroids is recorded.

In S402, a local iteration is performed according to the adjacency matrix;

$$c_{i,k}(0, t+1) = c_{i,k}(t+1)$$

$$q_{i,k}(0, t+1) = q_{i,k}(t+1)$$

$$c_{i,k}(s+1, t+1) = \frac{\sum_{j=1}^{N} a_{i,j} c_{j,k}(s, t+1) q_{j,k}(s, t+1)}{\sum_{j=1}^{N} a_{i,j} q_{j,k}(s, t+1)}$$

$$q_{i,k}(s+1, t+1) = \sum_{j=1}^{N} a_{i,j} q_{j,k}(s, t+1)$$

where S is the number of local iterations, $c_{i,k}(0,t+1)$ is initial centroids of the local iteration in the (t+1)-th global iteration, $q_{i,k}(0,t+1)$ is the number of users under the respective initial centroids of the local iteration in the (t+1)-th global iteration, $c_{i,k}(s+1,t+1)$ is centroids of the (s+1)-th local iteration in the (t+1)-th global iteration, $q_{i,k}(s+1,t+1)$ is the number of users under the respective centroids of the (s+1)-th local iteration in the (t+1)-th global iteration, t is the number of global iterations, $a_{i,j}$ is an interaction coefficient between the aggregators i and j, $c_{j,k}(s,t+1)$ is centroids of the s-th local iteration in the (t+1)-th global iteration, $q_{j,k}(s,t+1)$ is the number of users under the respective centroids of the s-th local iteration in the (t+1)-th global iteration, and N is the number of the load aggregators.

In S403, when increase in the number S of local iterations does not affect the number $q_{i,k}(s,t+1)$ of the users under the respective centroids, the iteration ends, specifically:

$$c_{i,k}(t+1) = c_{i,k}(S,t+1)$$

where S is the total number of local iterations, and $c_{i,k}(t+1)$ is the k-th centroid of an initial i-th load aggregator in the (t+1)-th overall iteration.

S404, if in this case $\forall k \in [1,K], i \in [1,N]$, $c_{i,k}(t+1)$ satisfies consistency requirements, that is, respective load aggregators obtain consistent centroids, then calculation is stopped and a result is output; otherwise, the method returns to the step S401 to continue the overall iteration.

S5, after the overall iteration ends, the respective load aggregators obtain the consistent centroids, and this centroid is consistent with the K-means centroids based on global data, to realize user classification.

In order to make objectives, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, rather than all the embodiments. Components of the embodiments of the present disclosure generally described and shown in the drawings herein can be arranged and designed in various configurations. Therefore, following detailed description of the embodiments of the present disclosure provided in the accompanying drawings is not intended to limit the scope of the claimed present disclosure, but merely represents selected embodiments of the present disclosure. Based on the embodiments of the present disclosure, all other embodiments obtained by those of ordinary skill in the art without creative work shall fall within the protection scope of the present disclosure.

Embodiment

In the method of a power user classification based on consistency distributed k-means according to the present disclosure, there are 5 load aggregators, and the numbers of users managed by the respective load aggregators are shown in Table 1:

TABLE 1

Numbers of users managed by the respective load aggregators

| Load aggregator | A | B | C | D | E |
|---|---|---|---|---|---|
| Number of users (households) | 5547 | 7249 | 7684 | 6989 | 7501 |

Each of the load aggregators performs distributed K-means clustering on daily load time series data of users at 48 points on the same day. The number of the centroids is set to 5.

The five load aggregators respectively obtain the power consumption data of all power users managed by the respective load aggregators on the same day. The power consumption data includes a serial number of power user and the daily load time series data at the 48 points. The daily load time series data is sampled every half hour from a beginning of the day at 00:00 to an end of the day at 23:30.

Each load aggregator performs, according to a uniform normalization criterion, a normalization operation on the daily load time series data of the power users under its management. A normalization formula is as follows:

$$x_{id,d} = \frac{1}{M_{id}} \cdot P_{id,d}, \; M_{id} = \sum_{d=1}^{48} P_{id,d}$$

where a subscript id represents a serial number of a user; $x_{id,d}$ represents power consumption data of a user with a serial number of id at the d-th time point after the normalization; $M_{id}$ represents a total amount of power consumption of the user with the serial number of id in this day; $P_{id,d}$ represents power consumption data, that is, an actual power consumption capacity, of the user with the serial number of id at the d-th time point before the normalization.

A 5×5 dimensional adjacency matrix A is formed according to the information sharing relationship of the 5 load aggregators.

The information sharing relationship of the load aggregators is usually determined by factors such as a geographic location of a data center and a power market. The adjacency matrix is as follows:

$$A = \begin{bmatrix} 0.2 & 0.2 & 0.2 & 0.2 & 0.2 \\ 0.2 & 0.2 & 0.2 & 0.2 & 0.2 \\ 0.2 & 0.2 & 0.2 & 0.2 & 0.2 \\ 0.2 & 0.2 & 0.2 & 0.2 & 0.2 \\ 0.2 & 0.2 & 0.2 & 0.2 & 0.2 \end{bmatrix}.$$

The adjacency matrix shows that any two of the five load aggregators have an information interaction relationship.

Each load aggregator performs K-means clustering on normalized daily load time series data of the power users under its management, to obtain 5 centroids and an owner-member relationship between the users and the centroids.

Specifically, K-means clustering is performed within each of the load aggregators by taking $c_{i,k}(t)$ as initial centroids, where i=1, 2, . . . , 5, k=1, 2, . . . , 5, t is an overall number of iterations. If t=0, the initial centroids are randomly selected. For each iteration, the number $q_{i,k}(t)$ of users under each centroid is recorded. That is, the number of users belonging to the k-th centroid in the t-th iteration of the load aggregator i is recorded. $C_i(t)$ denotes a centroid set of the load aggregator i, $Q_i(t)$ represents a set of the number distribution of users of the load aggregator i. In the step, respective centroid sets $C_i(t+1)$, i=1, 2, . . . , N and the corresponding number distribution $Q_i(t+1)$, i=1, 2, . . . , N of the users will be obtained for 5 groups.

The load aggregators having an information interaction relationship therebetween exchange their respective clustering results, that is, share the respectively obtained centroids and the corresponding number distribution of the users, and local iterations are carried out:

$$c_{i,k}(0, t+1) = c_{i,k}(t+1)$$

$$q_{i,k}(0, t+1) = q_{i,k}(t+1)$$

$$c_{i,k}(s+1, t+1) = \frac{\sum_{j=1}^{5} a_{ij} c_{j,k}(s, t+1) q_{j,k}(s, t+1)}{\sum_{j=1}^{5} a_{ij} q_{j,k}(s, t+1)}$$

$$q_{i,k}(s+1, t+1) = \sum_{j=1}^{5} a_{i,j} q_{j,k}(s, t+1)$$

where s is the number of local iterations.

When increase in the number $q_{i,k}(s,t+1)$ of local iterations does not affect the number s of users under each centroid, the iteration ends, $c_{i,k}(t+1)=c_{i,k}(S,t+1)$, where S is the total number of local iterations.

If in this case $\forall i$, k=1, 2, . . . , 5, $c_{i,k}(t+1)$ satisfies consistency requirements, that is, different load aggregators get consistent centroids, then the calculation is stopped; otherwise, the method returns to the step 4 and continues the overall iteration.

Figure 2:
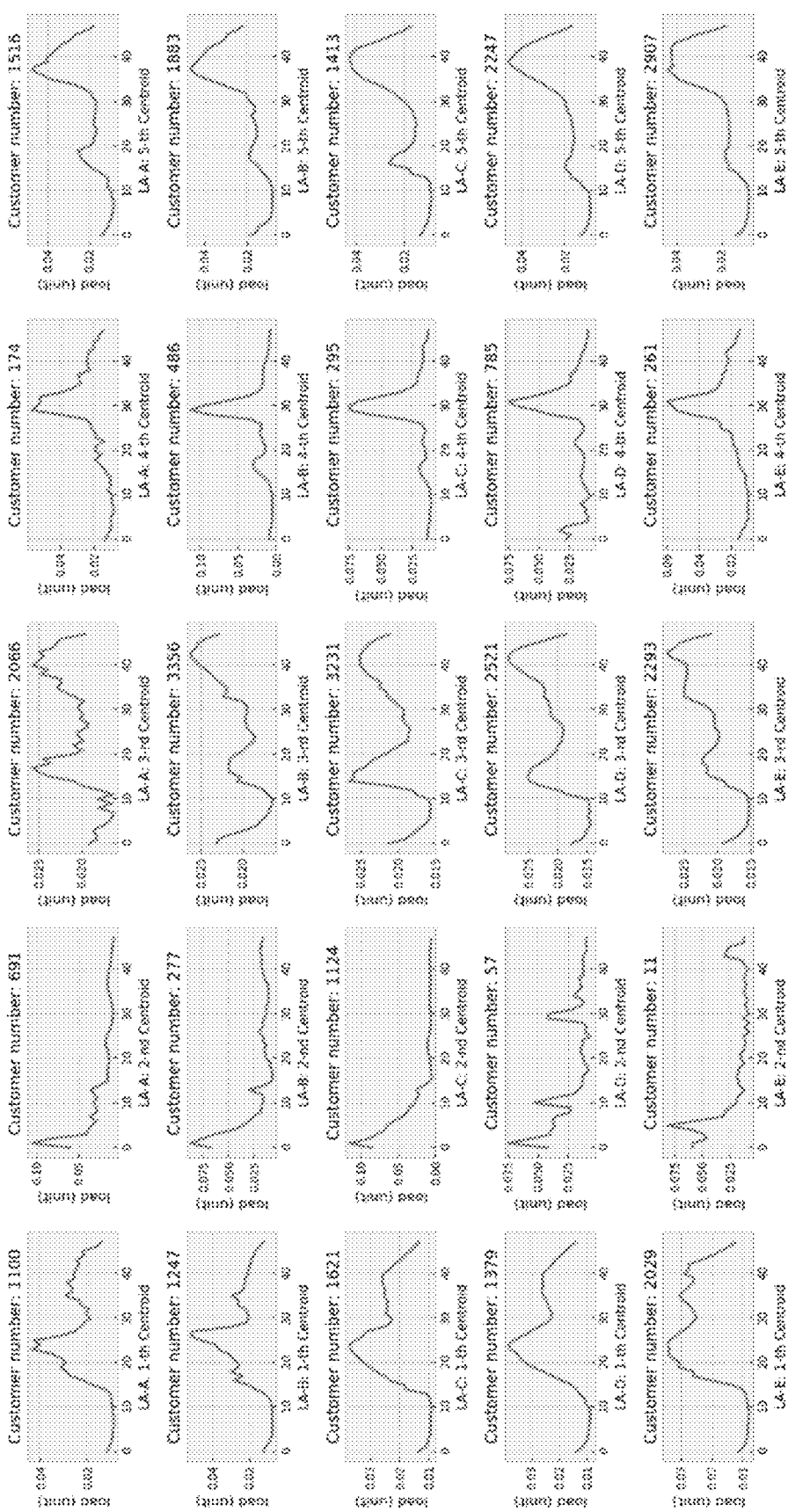
FIG. 2 shows distributed clustering results according to an embodiment.

The distributed clustering result is output, as shown in FIG. 2. After the overall iteration ends, the five load aggregators all get consistent centroids, and those centroids are consistent with the K-means centroids based on global data.

The present disclosure addresses issues such as an increasing scale of data processed by a clustering algorithm under background of a big data environment, and confidentiality of power consumption data of power users in the future power market. First, each area performs distributed cluster analysis on the time series power consumption data of the users under its management, the clustering results are shared between regions based on the information interaction relationship, and eventually the respective regions can obtain a globally consistent centroid by performing the iterative calculations. Since block processing of data and the information interaction only involve category information, the distributed K-means clustering can reduce a calculation amount of a single calculation and protect personal power consumption information of the power users. Moreover, the user classification results obtained based on distributed K-means clustering are consistent with the classification results obtained by clustering all user data, and the classification results can be subsequently used by power companies to analyze power consumption characteristics of different types of power users.

Based on the above description, according to the method of the present disclosure, multiple load aggregators can obtain globally consistent centroids without sharing power consumption data of users, laying a foundation for further research on power consumption behavior of the users and demand response behavior.

The above content is only to illustrate the technical ideas of the present disclosure and cannot be used to limit the scope of protection of the present disclosure. Any changes made on the basis of the technical solutions according to the technical ideas proposed by the present disclosure fall within the protection scope of the claims of the present disclosure.

What is claimed is:

1. A method of a power user classification based on distributed K-means, comprising:
   S1, obtaining, by N load aggregators, power consumption data of power users managed by the respective load aggregators, the power consumption data comprising serial numbers of the power users and time series load data of the power users;
   S2, performing, by each of the load aggregators, a normalization operation on the time series load data of the power users managed by the load aggregator according to a uniform normalization criterion;
   S3, forming a N×N dimensional adjacency matrix A according to an information sharing relationship of the load aggregators;
   S4, performing, by each load aggregator, K-means clustering on the time series load data of the power users managed by the load aggregator after the normalization operation in the step S2, to obtain respective centroids and user groups characterized by the respective centroids; sharing, by the respective load aggregators, the centroids and the number of users under the respective centroids based on the adjacency matrix in the step S3; performing overall iterations repeatedly according to a corresponding function; and obtaining consistent centroids by multiple load aggregators; and
   S5, after the overall iteration ends, obtaining, by the respective load aggregators, the consistent centroids consistent with K-means centroids based on global data, to realize user classification.

2. The method according to claim 1, wherein in the step S2, power consumption data $x_{id,d}$ of a user with a serial number of id at the d-th time point after the normalization operation is:

$$x_{id,d} = \frac{1}{M_{id}} \cdot P_{id,d}, \ M_{id} = \sum_{d=1}^{D} P_{id,d}$$

wherein a subscript id represents a serial number of user; $M_{id}$ represents a total amount of power consumption of the user with the serial number of id in a studied time scale; D represents a total number of data points in the studied time scale; $P_{id,d}$ represents power consumption data of the user with the serial number of id at the d-th time point before the normalization operation, which is an actual power consumption capacity.

3. The method according to claim 1, wherein in the step S3, the N×N dimensional adjacency matrix A is:

$$A = \begin{bmatrix} a_{1,1} & a_{1,2} & \cdots & a_{1,N} \\ a_{2,1} & a_{2,2} & \cdots & a_{2,N} \\ \vdots & \cdots & \ddots & \vdots \\ a_{N,1} & a_{N,2} & \cdots & a_{N,N} \end{bmatrix},$$

wherein N represents the number of load aggregators.

4. The method according to claim 3, wherein the adjacency matrix A has doubly stochastic:

$$\forall i, j \in [1, N], \sum_{k=1}^{N} a_{i,k} = 1, \sum_{k=1}^{N} a_{k,j} = 1;$$

$\forall i, j \in [1,N]$, if there is information interaction between load aggregators i and j, then $a_{i,j} > 0$; if $a_{i,j} > 0$, then $a_{j,i} > 0$; and $\forall i \in [1,N]$, $a_{i,i} > 0$.

5. The method according to claim 1, wherein the step S4 further comprises:
   S401, performing K-means clustering on time series load data of the power users managed by each load aggregator by taking $c_{i,k}(t)$ as initial centroids, wherein $i \in [1,N]$, $k \in [1,K]$, K represents the number of the centroids, and t represents the number of overall iterations;
   S402, performing local iteration according to the adjacency matrix;
   S403, finishing the local iteration, in a case that the number $q_{i,k}(s,t+1)$ of the users under the respective centroids is not changed with an increase in the number s of local iterations; and
   S404, if $\forall k \in [1,K]$, $i \in [1,N]$ after the local iterations, considering that $c_{i,k}(t+1)$ satisfies consistency requirements, and respective load aggregators obtain consistent centroids, then stopping calculation and outputting a result; otherwise, returning to the step S401 to continue the overall iteration.

6. The method according to claim 5, wherein in the step S401, if t=0, the initial centroids are randomly selected, and the number $q_{i,k}(t)$ of the users under each of the centroids is recorded.

7. The method according to claim 5, wherein in the step S402, the local iteration comprises:

$$c_{i,k}(0, t+1) = c_{i,k}(t+1)$$

$$q_{i,k}(0, t+1) = q_{i,k}(t+1)$$

$$c_{i,k}(s+1, t+1) = \frac{\sum_{j=1}^{N} a_{i,j} c_{j,k}(s, t+1) q_{j,k}(s, t+1)}{\sum_{j=1}^{N} a_{i,j} q_{j,k}(s, t+1)}$$

$$q_{i,k}(s+1, t+1) = \sum_{j=1}^{N} a_{i,j} q_{j,k}(s, t+1)$$

wherein s represents the number of local iterations, $c_{i,k}(0,t+1)$ represents initial centroids of the local iteration in the (t+1)-th global iteration, $q_{i,k}(0,t+1)$ represents the number of users under the respective initial centroids of the local iteration in the (t+1)-th global iteration, $c_{i,k}(s+1,t+1)$ represents centroids of the (s+1)-th local iteration in the (t+1)-th global iteration, $q_{i,k}(s+1,t+1)$ represents the number of users under the respective centroids of the (s+1)-th local iteration in the (t+1)-th global iteration, t represents the number of global iterations, $a_{i,j}$ represents an interaction coefficient between the aggregators i and j, $c_{j,k}(s,t+1)$ represents centroids of the s-th local iteration in the (t+1)-th global iteration, $q_{j,k}(s,t+1)$ represents the number of users under the respective centroids of the s-th local iteration in the (t+1)-th global iteration, and N represents the number of load aggregators.

8. The method according to claim 5, wherein the step S403 comprises:

$$c_{i,k}(t+1) = c_{i,k}(S,t+1)$$

wherein S represents the total number of local iterations, and $c_{i,k}(t+1)$ is the k-th centroid of an initial i-th load aggregator in the (t+1)-th overall iteration.

9. A non-transitory computer-readable storage medium for storing one or more programs, wherein the one or more programs include instructions, and the instructions, when executed by a computing device, cause the computing device to execute a method of a power user classification based on distributed K-means, and the method comprises:
   S1, obtaining, by N load aggregators, power consumption data of power users managed by the respective load aggregators, the power consumption data comprising serial numbers of the power users and time series load data of the power users;
   S2, performing, by each of the load aggregators, a normalization operation on the time series load data of the power users managed by the load aggregator according to a uniform normalization criterion;
   S3, forming a N×N dimensional adjacency matrix A according to an information sharing relationship of the load aggregators;
   S4, performing, by each load aggregator, K-means clustering on the time series load data of the power users managed by the load aggregator after the normalization operation in the step S2, to obtain respective centroids and user groups characterized by the respective centroids; sharing, by the respective load aggregators, the centroids and the number of users under the respective centroids based on the adjacency matrix in the step S3; performing overall iterations repeatedly according to a corresponding function; and obtaining consistent centroids by multiple load aggregators; and
   S5, after the overall iteration ends, obtaining, by the respective load aggregators, the consistent centroids consistent with K-means centroids based on global data, to realize user classification.

10. The non-transitory computer-readable storage medium according to claim 9, wherein in the step S2, power consumption data $x_{id,d}$ of a user with a serial number of id at the d-th time point after the normalization operation is:

$$x_{id,d} = \frac{1}{M_{id}} \cdot P_{id,d}, \quad M_{id} = \sum_{d=1}^{D} P_{id,d}$$

wherein a subscript id represents a serial number of user; $M_{id}$ represents a total amount of power consumption of the user with the serial number of id in a studied time scale; D represents a total number of data points in the studied time scale; $P_{id,d}$ represents power consumption data of the user with the serial number of id at the d-th time point before the normalization operation, which is an actual power consumption capacity.

11. The non-transitory computer-readable storage medium according to claim 9, wherein in the step S3, the N×N dimensional adjacency matrix A is:

$$A = \begin{bmatrix} a_{1,1} & a_{1,2} & \cdots & a_{1,N} \\ a_{2,1} & a_{2,2} & \cdots & a_{2,N} \\ \vdots & \cdots & \ddots & \vdots \\ a_{N,1} & a_{N,2} & \cdots & a_{N,N} \end{bmatrix},$$

wherein N represents the number of load aggregators.

12. The non-transitory computer-readable storage medium according to claim 11, wherein the adjacency matrix A has doubly stochastic:

$$\forall i, j \in [1, N], \sum_{k=1}^{N} a_{i,k} = 1, \sum_{k=1}^{N} a_{k,j} = 1;$$

$\forall i, j \in [1,N]$, if there is information interaction between load aggregators i and j, then $a_{i,j} > 0$; if $a_{i,j} > 0$, then $a_{j,i} > 0$; and
$\forall i \in [1,N]$, $a_{i,i} > 0$.

13. The non-transitory computer-readable storage medium according to claim 9, wherein the instructions, when executed by a computing device, cause the computing device to execute following steps:
   S401, performing K-means clustering on time series load data of the power users managed by each load aggregator by taking $c_{i,k}(t)$ as initial centroids, wherein $i \in [1,N]$, $k \in [1,K]$, K represents the number of the centroids, and t represents the number of overall iterations;
   S402, performing local iteration according to the adjacency matrix;
   S403, finishing the local iteration, in a case that the number $q_{i,k}(s,t+1)$ of the users under the respective centroids is not changed with an increase in the number s of local iterations; and
   S404, if $\forall k \in [1,K]$, $i \in [1,N]$ after the local iterations, considering that $c_{i,k}(t+1)$ satisfies consistency requirements, and respective load aggregators obtain consistent centroids, then stopping calculation and outputting a result; otherwise, returning to the step S401 to continue the overall iteration.

14. The non-transitory computer-readable storage medium according to claim 13, wherein in the step S401, if t=0, the initial centroids are randomly selected, and the number $q_{i,k}(t)$ of the users under each of the centroids is recorded.

15. The non-transitory computer-readable storage medium according to claim 13, wherein in the step S402, the local iteration comprises:

$$c_{i,k}(0, t+1) = c_{i,k}(t+1)$$

$$q_{i,k}(0, t+1) = q_{i,k}(t+1)$$

$$c_{i,k}(s+1, t+1) = \frac{\sum_{j=1}^{N} a_{i,j} c_{j,k}(s, t+1) q_{j,k}(s, t+1)}{\sum_{j=1}^{N} a_{i,j} q_{j,k}(s, t+1)}$$

$$q_{i,k}(s+1, t+1) = \sum_{j=1}^{N} a_{i,j} q_{j,k}(s, t+1)$$

wherein s represents the number of local iterations, $c_{i,k}(0,t+1)$ represents initial centroids of the local iteration in the (t+1)-th global iteration, $q_{i,k}(0,t+1)$ represents the number of users under the respective initial centroids of the local iteration in the (t+1)-th global iteration, $c_{i,k}(s+1, t+1)$ represents centroids of the (s+1)-th local iteration in the (t+1)-th global iteration, $q_{i,k}(s+1,t+1)$ represents the number of users under the respective centroids of the (s+1)-th local iteration in the (t+1)-th global iteration, t represents the number of global iterations, $a_{i,j}$ represents an interaction coefficient between the aggregators i and j, $c_{j,k}(s,t+1)$ represents centroids of the s-th local iteration in the (t+1)-th global iteration, $q_{j,k}(s,t+1)$ represents the number of users under the respective centroids of the s-th local iteration in the (t+1)-th global iteration, and N represents the number of load aggregators.

16. The non-transitory computer-readable storage medium according to claim 13, wherein the step S403 comprises:

$$c_{i,k}(t+1) = c_{i,k}(S, t+1)$$

wherein S represents the total number of local iterations, and $c_{i,k}(t+1)$ is the k-th centroid of an initial i-th load aggregator in the (t+1)-th overall iteration.

17. A classification device, comprising:
one or more processors;
a memory; and
one or more programs, wherein one or more programs are stored in the memory and configured to be executed by the one or more processors, and the one or more programs comprise instructions for executing a method of a power user classification based on distributed K-means, and the method comprises:
S1, obtaining, by N load aggregators, power consumption data of power users managed by the respective load aggregators, the power consumption data comprising serial numbers of the power users and time series load data of the power users;
S2, performing, by each of the load aggregators, a normalization operation on the time series load data of the power users managed by the load aggregator according to a uniform normalization criterion;
S3, forming a N×N dimensional adjacency matrix A according to an information sharing relationship of the load aggregators;
S4, performing, by each load aggregator, K-means clustering on the time series load data of the power users managed by the load aggregator after the normalization operation in the step S2, to obtain respective centroids and user groups characterized by the respective centroids; sharing, by the respective load aggregators, the centroids and the number of users under the respective centroids based on the adjacency matrix in the step S3; performing overall iterations repeatedly according to a corresponding function; and obtaining consistent centroids by multiple load aggregators; and
S5, after the overall iteration ends, obtaining, by the respective load aggregators, the consistent centroids consistent with the K-means centroids based on global data, to realize user classification.

18. The classification device according to claim 17, wherein in the step S2, power consumption data $x_{id,d}$ of a user with a serial number of id at the d-th time point after the normalization operation is:

$$x_{id,d} = \frac{1}{M_{id}} \cdot P_{id,d}, \quad M_{id} = \sum_{d=1}^{D} P_{id,d}$$

wherein a subscript id represents a serial number of user; $M_{id}$ represents a total amount of power consumption of the user with the serial number of id in a studied time scale; D represents a total number of data points in the studied time scale; $P_{id,d}$ represents power consumption data of the user with the serial number of id at the d-th time point before the normalization operation, which is an actual power consumption capacity.

19. The classification device according to claim 17, wherein in the step S3, the N×N dimensional adjacency matrix A is:

$$A = \begin{bmatrix} a_{1,1} & a_{1,2} & \cdots & a_{1,N} \\ a_{2,1} & a_{2,2} & \cdots & a_{2,N} \\ \vdots & \cdots & \ddots & \vdots \\ a_{N,1} & a_{N,2} & \cdots & a_{N,N} \end{bmatrix},$$

wherein N represents the number of load aggregators.

20. The classification device according to claim 19, wherein the adjacency matrix A has doubly stochastic:

$$\forall i, j \in [1, N], \sum_{k=1}^{N} a_{i,k} = 1, \sum_{k=1}^{N} a_{k,j} = 1;$$

$\forall i, j \in [1,N]$, if there is information interaction between load aggregators i and j, then $a_{i,j} > 0$; if $a_{i,j} > 0$, then $a_{j,i} > 0$; and
$\forall i \in [1,N]$, $a_{i,i} > 0$.

* * * * *